(12) United States Patent
Clarke et al.

(10) Patent No.: US 11,402,053 B2
(45) Date of Patent: Aug. 2, 2022

(54) VEHICLE SUPPORT STRUCTURE FOR A WORKSITE

(71) Applicant: PROSTAR MANUFACTURING INC., Okotoks (CA)

(72) Inventors: Daniel John Clarke, Calgary (CA); Douglas Andrew Hunter, Calgary (CA); Daniel Harvard Kusler, Foothills (CA)

(73) Assignee: Prostar Energy Technologies (USA) LLC, Calgary (CA)

( * ) Notice: Subject to any disclaimer, the term of this patent is extended or adjusted under 35 U.S.C. 154(b) by 1088 days.

(21) Appl. No.: 16/061,306

(22) PCT Filed: Dec. 7, 2016

(86) PCT No.: PCT/CA2016/051435
§ 371 (c)(1),
(2) Date: Jun. 11, 2018

(87) PCT Pub. No.: WO2017/096476
PCT Pub. Date: Jun. 15, 2017

(65) Prior Publication Data
US 2018/0363834 A1    Dec. 20, 2018

Related U.S. Application Data

(60) Provisional application No. 62/266,271, filed on Dec. 11, 2015.

(51) Int. Cl.
*F16M 7/00* (2006.01)
*E21B 15/00* (2006.01)
(Continued)

(52) U.S. Cl.
CPC .............. *F16M 7/00* (2013.01); *E01C 9/083* (2013.01); *E21B 7/024* (2013.01); *E21B 15/006* (2013.01); *E21B 41/00* (2013.01); *F16M 5/00* (2013.01)

(58) Field of Classification Search
CPC .. F16M 7/00; F16M 5/00; E21B 7/024; E21B 41/00
(Continued)

(56) References Cited

U.S. PATENT DOCUMENTS 5,921,336 A      7/1999  Reed
6,006,676 A  *  12/1999  Creek ................... B65D 19/44
                                                                108/55.3
(Continued)

FOREIGN PATENT DOCUMENTS

CA      2838221 A1 *  6/2015  ............. E21B 15/00
CA      2838221 A1     6/2015
(Continued)

OTHER PUBLICATIONS

International Search Report & Written Opinion for PCT/CA2016/051435 dated Feb. 20, 2017.

*Primary Examiner* — Jose V Chen
(74) *Attorney, Agent, or Firm* — ArentFox Schiff LLP

(57) ABSTRACT

A vehicle support structure, which in petroleum wellsite operations is commonly called a rig mat or a ground stabilizing mat, includes: a main body including an upper surface, an underside, a front end and a rear end, the main body defining a planar structuring with a thickness; a front pad coupled to the main body and positioned adjacent the front end; a rear pad coupled to the main body and positioned adjacent the rear end, the front pad and the rear pad each configured to be moveable between a supporting position protruding from the underside of the main body and a retracted position in plane or retracted from the underside; a front pad drive mechanism for the front pad, the front pad drive mechanism configured to drive the front pad to move between the supporting position and the retracted position and to move the front pad forward and backwards and side to side relative to the main body; and a rear pad drive mechanism for the rear pad, the rear pad drive mechanism configured to drive the rear pad to move between the (Continued)

supporting position and the retracted position and to move the rear pad forward and backwards and side to side relative to the main body, the front pad and the rear pad being configured to operate to support the main body in an elevated position relative to a ground surface and configured to move the main body forward and backwards and side to side relative to the front pad and the rear pad and over the ground surface. In use as a rig mat, a method for well site operations includes: placing the rig mat at a position on a first well site; positioning a rig on the rig mat; and adjusting the position of the rig mat while the rig remains supported on the rig mat such that the rig is centered on a wellhead of the well site.

10 Claims, 11 Drawing Sheets

(51) Int. Cl.
| | |
|---|---|
| *E21B 7/02* | (2006.01) |
| *E01C 9/08* | (2006.01) |
| *E21B 41/00* | (2006.01) |
| *F16M 5/00* | (2006.01) |

(58) Field of Classification Search
USPC .................................... 108/143, 51.11, 55.1
See application file for complete search history.

(56) References Cited

U.S. PATENT DOCUMENTS

| | | | | |
|---|---|---|---|---|
| 6,966,734 | B2 * | 11/2005 | Toteff | B60P 3/077 |
| | | | | 410/104 |
| 7,819,209 | B1 * | 10/2010 | Bezner | B62D 57/02 |
| | | | | 180/8.5 |
| 7,971,733 | B2 * | 7/2011 | Ponto | B65D 19/44 |
| | | | | 108/55.1 |
| 9,168,962 | B2 * | 10/2015 | Trevithick | B62D 57/02 |
| 9,366,053 | B2 * | 6/2016 | Thiessen | E04H 12/345 |
| 9,951,539 | B2 * | 4/2018 | Roodenburg | E21B 7/02 |
| 2014/0271094 | A1 | 9/2014 | Crisp et al. | |
| 2016/0186495 | A1 | 6/2016 | Flusche | |
| 2017/0106925 | A1 * | 4/2017 | Gupta | B62D 57/032 |

FOREIGN PATENT DOCUMENTS

| | | | | |
|---|---|---|---|---|
| CA | 2871406 A1 * | 4/2016 | | B62D 57/02 |
| WO | 2013109147 A2 | 7/2013 | | |

* cited by examiner

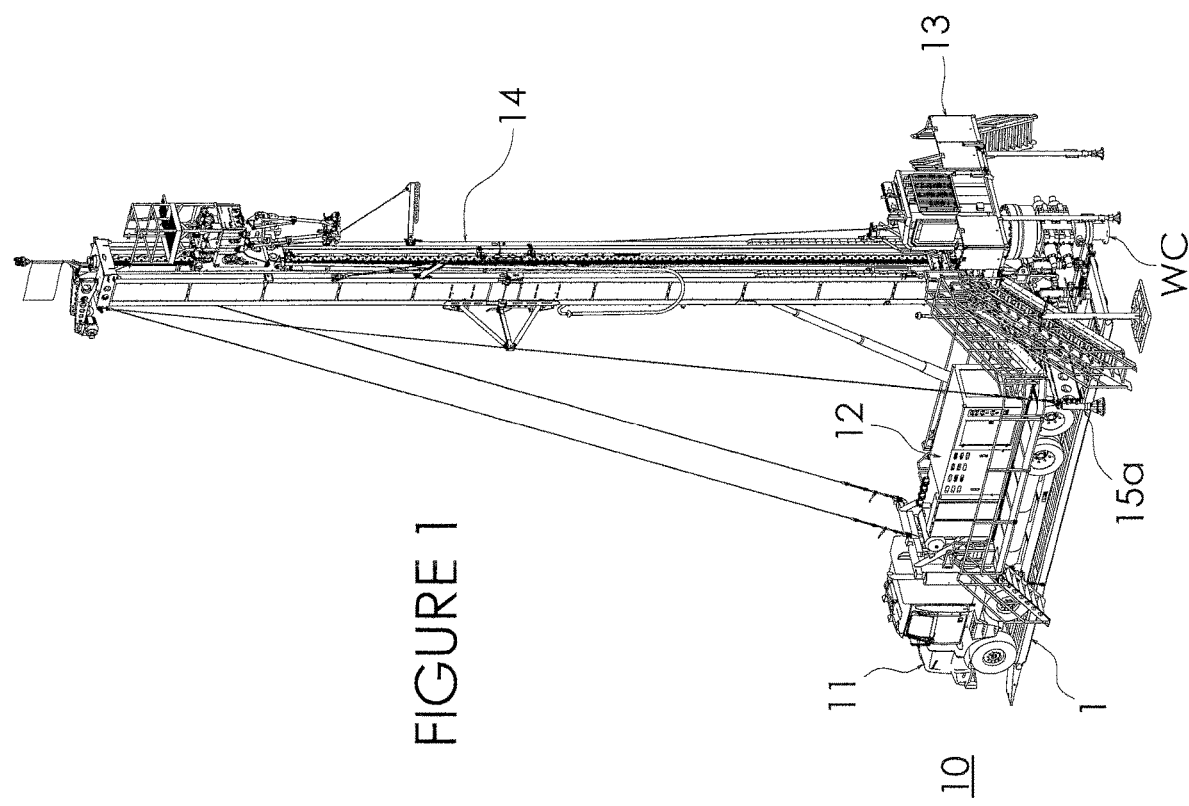

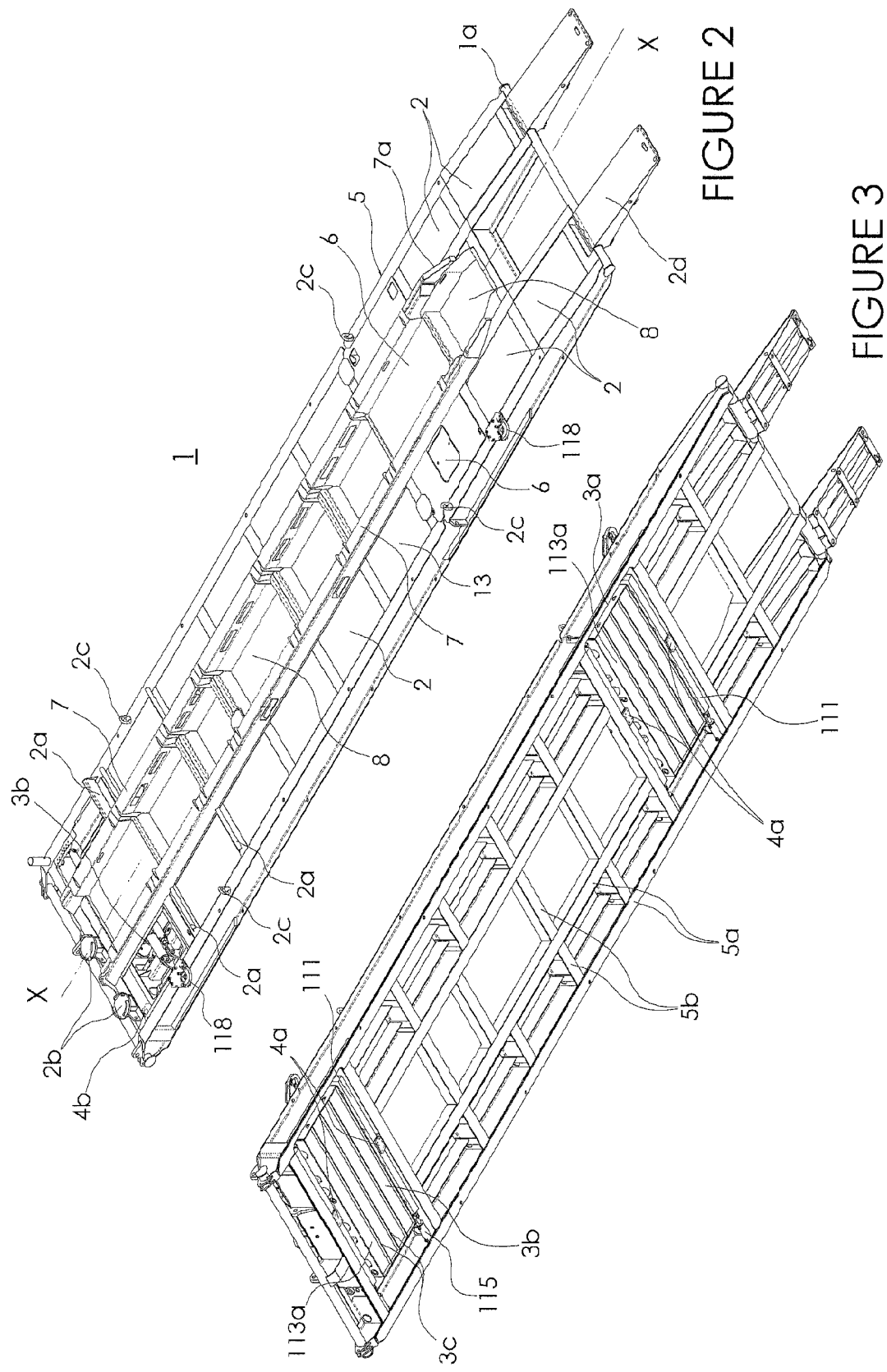

VEHICLE SUPPORT STRUCTURE FOR A WORKSITE

PRIORITY CLAIM

This application claims priority to U.S. 62/266,271, filed Dec. 11, 2015.

FIELD

The invention relates to a vehicle support structure for a worksite and methods for using same.

BACKGROUND

Environmental protection and site ground instability sometimes requires the placement of a vehicle support structure for a worksite on which heavy equipment is placed.

In wellbore operations, these structures are sometimes alternatively called ground stabilizing mats or rig mats. One use for a rig mat is to support a vehicle-conveyed, such as truck-conveyed rig adjacent to a well. When a rig, such as a drill rig or a service rig, is brought in to a wellsite for wellbore operations, it may be supported on a mat adjacent the well head. Generally, a rig mat is planar where the length and width measured across the upper surface is much greater than the height. Rig mats are, thereby, formed as plates or skids.

Generally, at a wellsite, one or more vehicle support structures are placed on the ground around the wellhead and the truck-conveyed rig is driven onto the one or more vehicle support structures and the rig is positioned with its working axis in alignment with well center. It may be necessary to move the truck toward and away from the wellhead a number of times in order to have the truck properly positioned in alignment with well center.

SUMMARY

In accordance with a broad aspect of the present invention, there is provided a ground stabilizing mat comprising: a main body, a front pad and a rear pad supporting the main body and a front pad drive mechanism for the front pad, the front pad drive mechanism configured to lift the main body relative to the front pad and configured to move the main body forward and backwards and side to side relative to the front pad and a rear pad drive mechanism for the rear pad, the rear pad drive mechanism configured to lift the main body relative to the rear pad and configured to move the main body forward and backwards and side to side relative to the rear pad.

In accordance with another broad aspect, there is provided a vehicle support structure comprising: a main body including an upper surface, an underside, a front end and a rear end, the main body defining a planar structuring with a thickness; a front pad coupled to the main body and positioned adjacent the front end; a rear pad coupled to the main body and positioned adjacent the rear end, the front pad and the rear pad each configured to be moveable between a supporting position protruding from the underside of the main body and a retracted position in plane or retracted from the underside; a front pad drive mechanism for the front pad, the front pad drive mechanism configured to drive the front pad to move between the supporting position and the retracted position and to move the front pad forward and backwards and side to side relative to the main body; and a rear pad drive mechanism for the rear pad, the rear pad drive mechanism configured to drive the rear pad to move between the supporting position and the retracted position and to move the rear pad forward and backwards and side to side relative to the main body, the front pad and the rear pad being configured to operate to support the main body in an elevated position relative to a ground surface and configured to move the main body forward and backwards and side to side relative to the front pad and the rear pad and over the ground surface.

In accordance with another broad aspect of the present invention, there is provided a method for well site operations comprising: placing a rig mat at a position on a first well site; positioning a rig on the rig mat; and adjusting the position of the rig mat while the rig remains supported on the rig mat such that the rig is centered on a wellhead of the well site.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings:

FIG. 1 is a top, rear perspective view of a rig supported on a vehicle support structure commonly called a rig mat or a ground stabilizing mat;

FIG. 2 is a top, front perspective view of a vehicle support structure commonly called a rig mat or a ground-stabilizing mat;

FIG. 3 is an under side, rear perspective view of the rig mat of FIG. 2;

DESCRIPTION OF VARIOUS EMBODIMENTS

Figure 4:
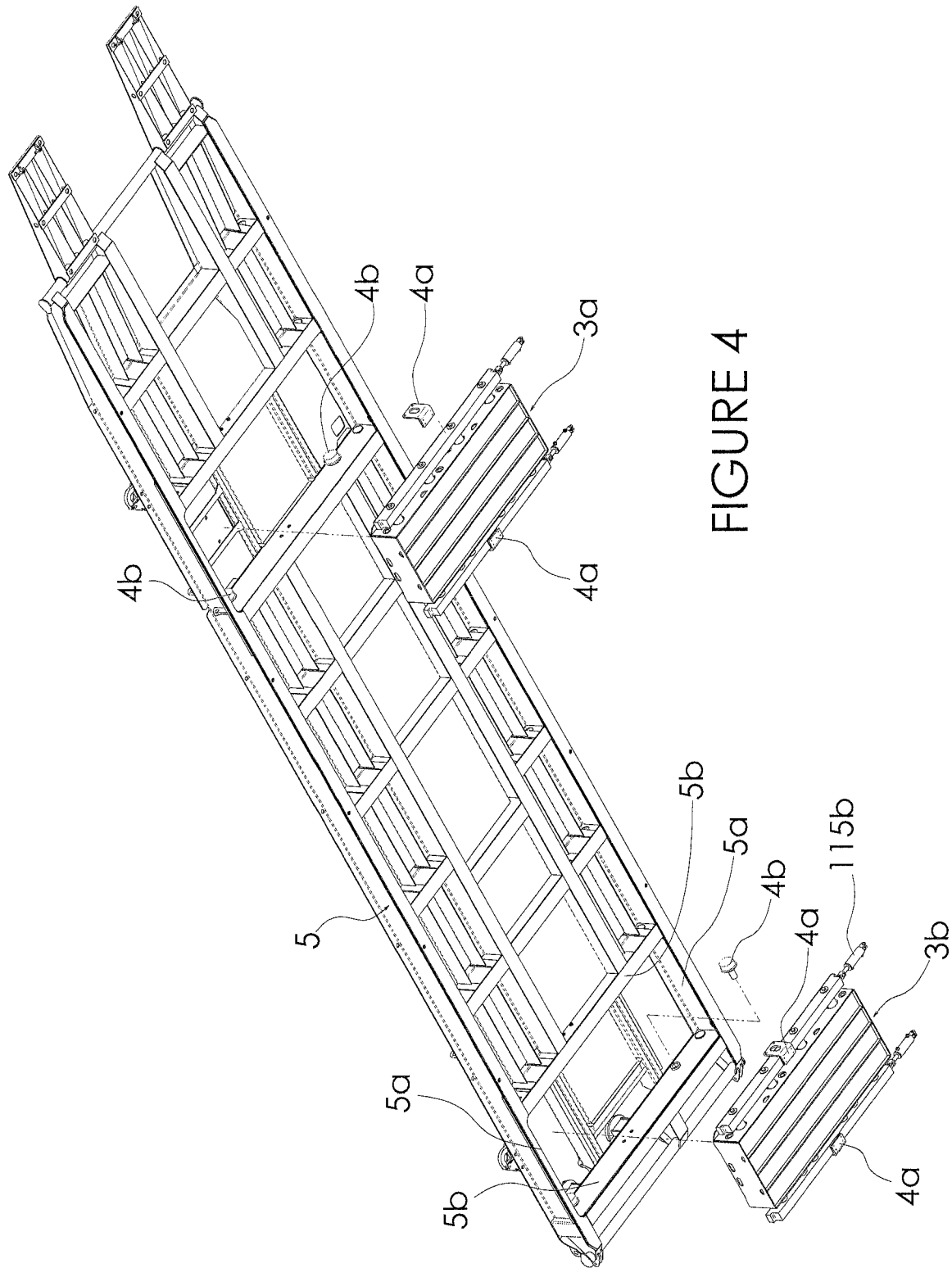
FIG. 4 is an expoded, under side, front perspective view of the rig mat of FIG. 2.

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

This invention relates to a vehicle support structure, which may be referred to as a ground-stabilizing mat or a rig mat, and a method for wellsite operations, in particular for movement of a vehicle support structure along the ground.

In some areas, the ground surface is unstable and unsuitable for properly supporting heavy equipment. In some operations, even if the ground surface is reasonably stable, the equipment is so heavy or large that surface stabilization is required to ensure a certain level of support and to mitigate significant environmental damage. Thus, for both safety and environment protection, vehicle support structures are often employed. In well rig operations, these vehicle support structure may be known as rig mats ground-stabilizing mats.

Some well rigs, such as drilling or service rigs are truck conveyed. One such rig 10 is illustrated in FIG. 1. In some embodiments, rig 10 can comprise a substructure comprising a vehicle and a support frame, as represented by truck 11 with a cab and a bed shown in FIG. 1. Truck 11 can comprise a heavy-duty tractor such as those used in a tractor-trailer unit, as well known to those skilled in the art. In some embodiments, rig 10 can be driven to a well location, either to drill a well or to service an existing well, shown as blow-out preventer ("BOP") which will define well centre WC. Rig 10 can comprise many components such as hydraulic drive assembly 12, platform 13 and derrick mast 14.

While derrick mast 14 is folded for transport, it is moved to an erected position for use. While a vertical mast is illustrated here, the derrick mast in some rigs is positioned as a slant. A rig's well centering axis is determined based on the location of an operational axis of the rig mast. If the rig mast is offset on the rig, the rig's centering axis may not bisect the rig.

It will be appreciated, therefore, that, for safety, the rig must be positioned on a stable structure. As such, for stability, a rig mat 1 may be placed on the ground and the rig apparatus may then be driven onto the rig mat.

Rear outriggers 15a, front outriggers and telescopic legs may be used for additionally stabilizing rig apparatus 10 on rig mat 1 and relative to the ground surrounding a well site.

While previous rig mats may be nothing more than a rigid plate sometimes formed as a skid for transport, the present rig mat offers expanded utility and facilitates wellsite rig operations.

With reference to FIGS. 2 to 12, rig mat 1 includes a main body 5, a front pad 3a and a rear pad 3b. Each of front pad and rear pad 3a, 3b are mounted in the main body and each include a drive assembly configured to support the main body, lift, and move the main body. The operation of the pads and their drive assemblies are described herein after.

Main body 5 can include a structural frame including long beam supports 5a and crossbeam supports 5b. The main body defines the overall shape of the rig mat structure. The main body is planar having a relatively small thickness (i.e. height), but an upper surface area large enough to support all the tires of a vehicle the size of a transport-type truck and trailer. In one embodiment, for example, the main body has an upper surface (FIG. 2) and a lower surface (FIG. 3) having a similar perimeter shape to that of the upper surface and a thickness spanning between the upper surface and the lower surface. The upper surface may be for example, 8 to 12 feet wide and 30 to 60 feet long and the thickness may be, for example, 10 inches to 2 feet. Thus, the rig mat is planar, for example, having a length that is about 15 to 60 times more than its thickness.

The main body may be configured as a skid for facilitated transport. For example, the main body may include at one or both of front end 1a and rear end: a terminal crossbeam 5b formed as a rugged pull bar and underside chamfered ends adjacent to the pull bars so that the underside long beam 5a surfaces act like runners.

The structural frame of long beam and cross beam supports 5a, 5b can support an upper floor surface. When used as a rig mat, the mat may be intended to support a vehicle such as a truck-conveyed rig thereon. Such a mat, may effectively define a long axis x along its length parallel to long beam supports 5a, and its upper floor may include a pair of tire support tracks 2 extending substantially parallel to axis x. Tracks 2 are side by side and spaced apart a distance to accept and support the rig's tires thereon. Tracks 2 may be surfaced with grating to permit tire-borne debris to fall through. The tracks may include raised location indicators such as raised markers 2a to identify a suitable location of a truck's tires, when a vehicle is properly positioned on the rig mat. Raised markers 2a may be positioned on one or both tracks 2 and markers 2a are positioned in the track width, for example extending substantially from side to side across the track on which it is installed. Raised markers 2a have a height that raises them above the normal surface of tracks 2. As such, when a truck tire rides over the raised marker, the truck driver will feel the sensation of truck being raised and then going back down.

In one embodiment, there are a pair of raised markers 2a on each track. The raised markers of each pair are spaced apart a distance and the pairs are aligned on the two tracks. Each pair of raised markers is positioned close to the rig mat's rear end, which is the end accommodating rear end pad 3b, but are positioned inwardly of the position of the rear end pad. In other words, rear end pad 3b is positioned between the rear end of the rig mat and the raised markers 2a, along axis x. Thereby, raised markers 2a indicate the desired position of a supported vehicle's tires to be close to end pad 3b but on a side of the end pad towards the center of the length of the rig mat and in the distance between the rear end pad and the front-end pad. This ensures that the truck tires are positioned in the distance between the rear end pad and the front-end pad, which is close to the center of gravity of the rig mat.

Also or alternately, a raised guide bar 7 may be positioned along the inward side or outward side of each track. Guide bars 7 also extend substantially parallel to long axis x. Guide bars 7 are raised relative to tracks 2 and guide the truck tires along tracks 2 by preventing the tires from rolling inwardly off the tracks. In particular, each guide bar 7 may have a substantially vertical raised sidewall positioned alongside its track that creates a barrier against a tire rolling sideways (i.e. inwardly in the illustrated embodiment) off the track. The front end 7a of each guide bar may be ramped and/or inwardly tapered to ensure the truck tires are guided onto tracks 2.

The front end 1a of the rig mat main body may form a ramp-like structure to facilitate driving of a vehicle onto the rig mat. For example, the front-end upper surface of the rig mat main body may be sloped such that the tracks at the front end slope down toward the end 1a. If the end is formed as a skid with an underside chamfering and, thereby, cannot slope right down to a plane even with the major underside surface, additional ramps 2d can be provided for installation at end 1a to lead to tracks 2. Ramps 2d may be connected to end 1a by hinges or may be detachably coupled.

Between the guide bars, there may be one or more catch trays 8 for liquid containment, for example to contain a liquid leak from the vehicle such as hydraulic fluid or engine fluids. Catch trays 8 may be liquid tight and have a depth to contain an amount of liquid. The trays may be removable from main body 2 for cleaning.

The main body may also include pads 2b, formed as circular plates, on the upper surface rigidly integrated into beams 5a and/or 5b for receiving the ends of the rig's telescoping support legs and eyes 2c for receiving tie downs secured between the rig, such as its axles, and the rig mat. Pads 3a, 3b provide a number of purposes. While the pads are mounted in main body 5, they are moveable, via their drive assemblies, relative to the body. The pads can be used to drive the rig mat into engagement with the ground surface on which it is placed, to level the mat and to move the mat. Pads 3a, 3b can thereby be moved using their drive assemblies to support the main body and lift or lower it and move it forwards, back or side to side.

The front pad 3a and the rear pad 3b each are configured to be moveable between a supporting position protruding from the underside of the main body and a retracted position in plane or retracted up from the underside, for example residing in the thickness of the main body. The drive assemblies are configured to drive the pads to move between the supporting position and the retracted position and to move the pads forward, backwards, and side to side relative to the main body.

Pads 3a, 3b may each include cleats 3c on their bottom surfaces. While the bottom surfaces may be formed of rugged materials such as steel plate, beams or bars, cleats 3c protrude from each pad's bottom surface and are narrow or toothed to bite into the ground surface. The cleats may be formed to resist sliding movement of the mat over the ground. While a vertical rig, as shown in FIG. 1, generally tends to transmit forces vertically through mat into the ground, operations using a slant rig may tend to develop forces sideways relative to the wellhead such as may tend to push or pull the rig towards or away from the wellhead. These forces may urge the rig along its long axis. Cleats 3c may therefore be formed resist these longitudinal forces, for example, cleats 3c may extend from side to side, substantially perpendicular to the long axis x.

Each pad and its drive assembly are similar. The description will describe rear pad 3b and its drive assembly, but the description applies to both pads.

In one embodiment, pad 3b is mounted in main body 5. To permit the pad to engage the ground surface below the mat, the pad's lower surface 113a is exposed on the bottom surface of the mat. Pad 3b is installed within a box frame constructed within main body 5 formed by long support and cross support beams 5a, 5b. The box frame defines a space, which opens on the bottom surface of the mat. The box frame can be open to expose pad 3b on the upper surface of the mat as well, but this is not needed and generally, the space is covered and, for example, may be better used to accommodate the tracks 2, the containment pans, etc. An access hatch 6 may be useful on the upper surface through which there below the pad and its drive assembly may be accessed.

Pad 3b is secured in the box frame of the main body by brackets 4a below and bearings, such as rollers 4b, above. Brackets 4a are angle brackets connected at one end to the main body and with their other end protruding out in to the box frame below the pad. A bearing surface may be positioned between bracket 4a and the pad to facilitate movement of the pad across the bracket. Rollers 4b are secured to the main body and ride along an upper surface of pad, while load is transmitted therethrough. Rollers 4b could be replaced with other bearing surfaces such as sliders or any other type of bearing that allows linear motion to occur.

When the rig mat is at rest and not in the process of being moved, at least a portion of the main body and possibly the pads 3a, 3b rest on the ground surface below the mat. However, when it is desired to move the mat, front pad 3a and rear pad 3b can be operated to lift the main body off the ground and support the main body to move it. In particular, a pad drive mechanism is provided for each pad and the pad drive mechanisms are configured to lift the main body relative to the pads and are further configured to translate the main body forward, backwards and/or side-to-side, directly or in combinations for rotational/diagonal translation. The pad drive mechanism for the front pad can operate independently from the rear pad drive mechanism. After the mat has been moved, front pad 3a and rear pad 3b can be operated by their drive mechanisms to lower the main body back down onto the ground.

Movement to lift the main body of the rig mat is achieved by driving the pads from the retracted position to the supporting position, wherein the pads protrude from an underside of the main body. Movement to lower the main body down onto the ground is achieved by driving the pads from the supporting position into the retracted position, wherein the pads are substantially at the same or retracted from a plane defined by the underside of the main body. The movement between the supporting position and the retracted position is substantially orthogonal to the plane of the underside and in operation, this is substantially vertical.

When the pads are in the supporting position, the main body can be moved side-to-side and front and back by driving the main body side to side and front and back relative to the pads.

In one embodiment, pad 3b supports main body 5 through rollers 4b and is moveable vertically, front to back and side to side within the box frame. The pad drive assembly for pad 3b is configured for moving the pad vertically, front and back and side to side relative to the box frame and thereby relative to main body 5.

Considering that the pad actually supports the main body during movement of the rig mat, to state this relationship another way, main body 5 is supported on the pad by rollers 4b mounted within the box frame. The rollers ride on top of the pad and the main body can be driven front to back and side to side relative to the pad by the pad drive mechanism. With the main body supported on the pad, the pad stays stationary engaged against the ground, and the main body is actually moved vertically, front to back and side to side by pad 3b and its drive assembly.

Figure 5:
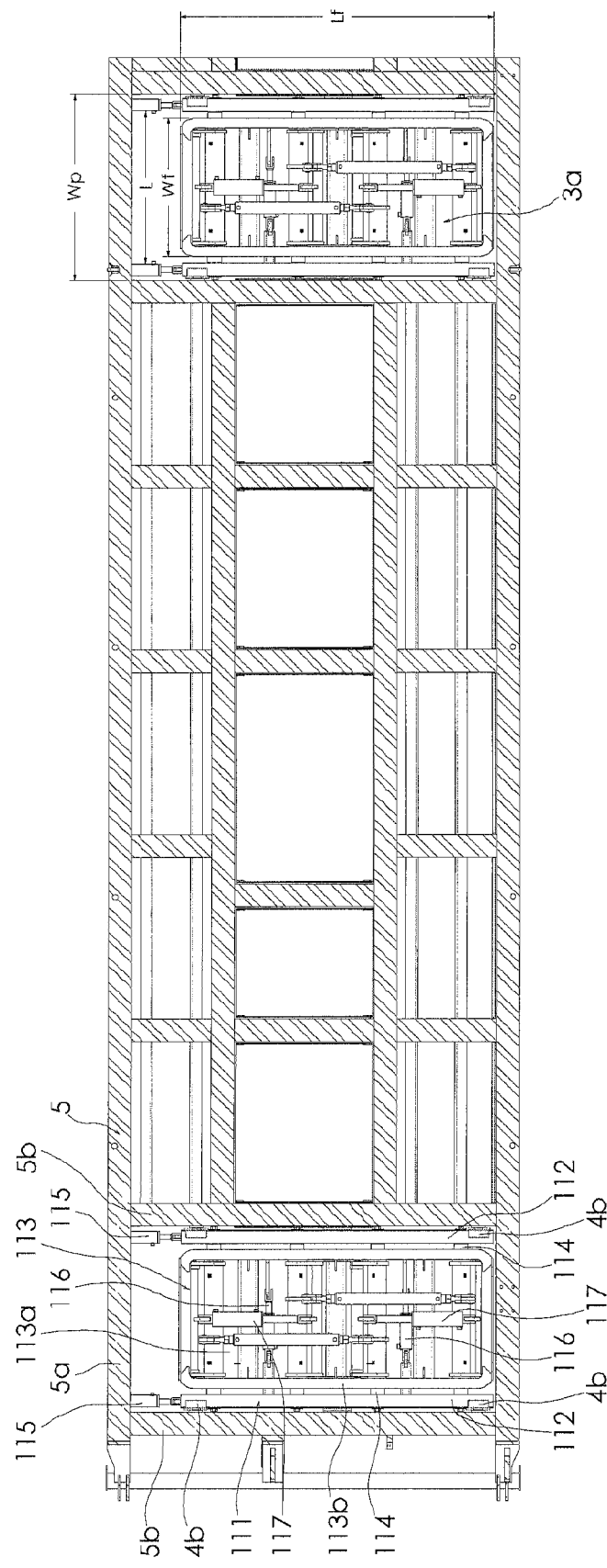
FIG. 5 is a plan view of the rig mat of FIG. 2, with the upper surface cut away to expose the pads.
Figure 6:
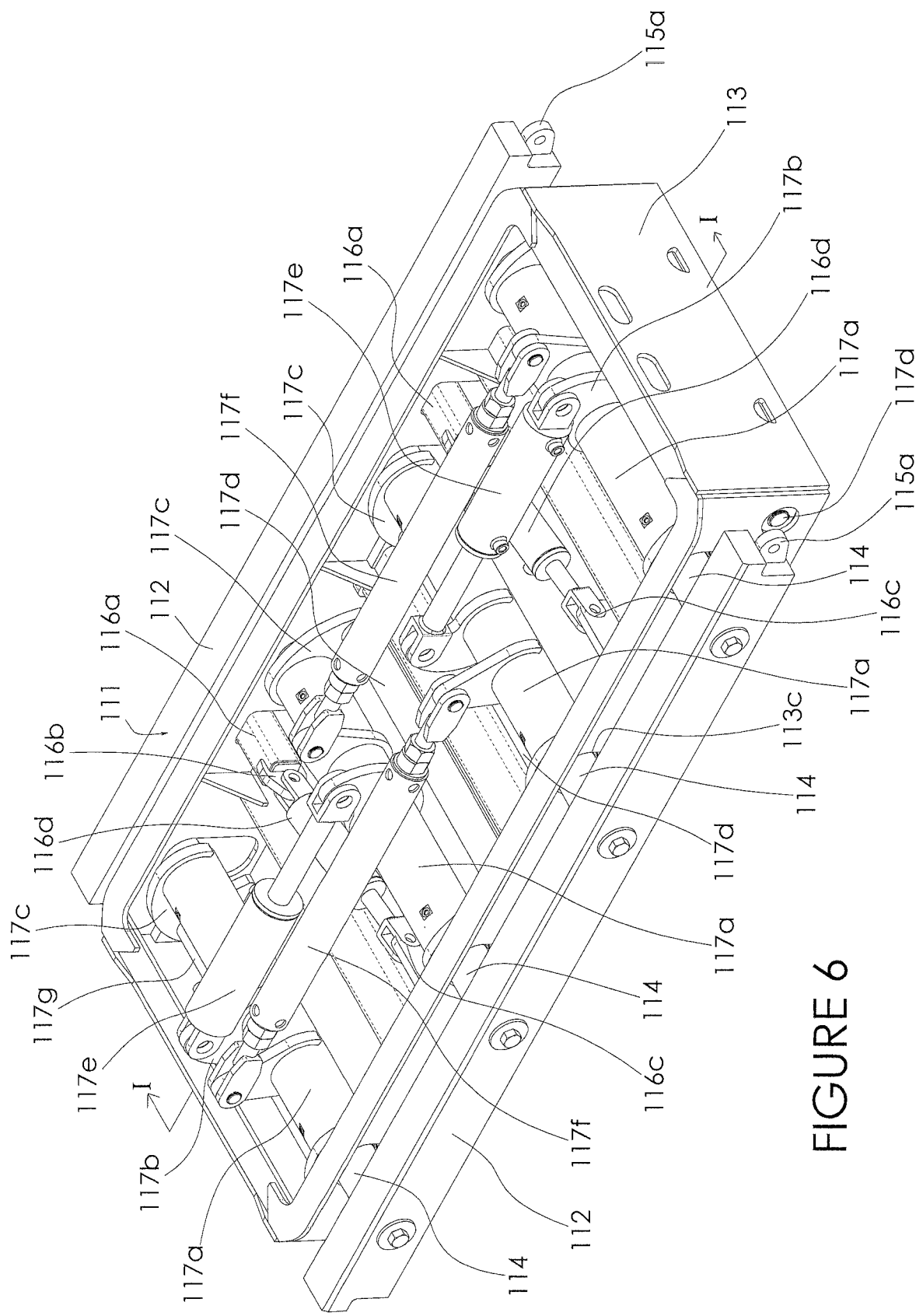
FIG. 6 is an upper perspective view of a pad and pad drive assembly useful in a rig mat.

As shown in FIGS. 4 and 5, a pad 3b can include a frame 111 and a foot 113. The foot is the part that engages the ground. The frame acts between the foot and main body 5. Frame 111 is moveably coupled to the main body and foot 113 is moveably coupled to the frame. With reference also to FIGS. 6 to 12, one embodiment of an enlarged pad assembly including a pad 3b and its pad drive assembly is shown. Some components of the main body, such as rollers and brackets are also shown for reference.

The illustrated pad includes a frame 111 and a foot 113 carried on the frame. Frame 111 is shaped like a ladder with a pair of spaced apart side rails 112 and two or more cross rungs 114 spaced apart and secured between the side rails.

The side rails are spaced apart a distance that defines a pad width Wp and the rungs have a length L defined by the width Wp less the thickness of the rails 112. In one embodiment, the side rails may be rectangular in cross section and the cross rungs may be cylindrical. Cross rungs 114 may be bolted between rails 112.

Foot 113 is carried on the frame. Foot 113 includes a base 113a on which cleats 3c are secured. Foot 113 may further include sidewalls 113b and end walls extending up from the base. The sidewalls are positioned on each side of the base and define a width Wf of the foot. Sidewalls 113b each include a plurality of holes 113c. The holes 113c are positioned in pairs with each hole of the pair aligned between the sidewalls.

Holes 113c allow the rungs 114 to extend out beyond the sides of the foot. The width Wf of foot 113 is less than length L of rungs 114. Rungs 114 do not touch or engage the edges of holes 113c. Holes 113a are sized to permit the full range of motion of rungs 114. For example, the holes are sized to have a height allowing the full vertical range of the rungs relative to the base of the foot without the rungs touching or otherwise catching on the sidewalls.

As noted, brackets 4a and rollers 4b are secured to main body 5. Pad 3b supports main body 5 via rollers 4b that rest and ride on rails 112. In particular, frame rails 112 are pinched between brackets 4a and rollers 4b. Bearing in mind that foot 113 is intended to remain on the ground when the main body is lifted off the ground, any vertical movement of frame 111 relative to foot 113 is directly transferred to main body 5. Width Wp, which is the distance from the outer side of one rail 112 to the outer side of the other rail 112, is just less than the front to back dimension of the box frame in which the pad is installed. As such, any forwards/backwards movement of frame 111 in the box frame is transferred to main body 5. Flanges 4b' on the sides of rollers 4b engage the sides of frame 111. The flanges are positioned between frame and the box frame to ensure the side rails remain on the rollers and the frame remains centered front to back in the box frame. However, frame 111 is shorter than the side-to-side dimension of the box frame and frame 111 can move side to side within the box frame of main body 5.

Operation of pad 3b moves the main body of the rig mat. Recalling that during movement, main body 5 is supported on pad 3b and the pad stays stationary on the ground during use, a description follows of the illustrated drive assembly, which is operable to move main body 5 vertically, front-to-back and side-to-side.

The pad drive assembly includes a plurality of drivers to move main body 5 relative to pad 3b. There are drivers to lift and lower the main body relative to the pad. There are also drivers to move the main body front to back and side to side relative to the pad. The drivers operate in the thickness of the box frame such that the drivers or parts thereof do not protrude above the upper surface. In particular, since the vehicle support structure is planar to allow a vehicle to be driven thereon, the drivers are configured for movement in plane relative to the main body. All driver movement is configured to be within the thickness of the main body.

In the illustrated embodiment, the drive assembly includes a first driver 115 to move the main body 5 sideways relative to frame 111. The assembly also includes a second driver 116 to move the frame forward and backward and a third driver 117 to move the frame vertically, each relative to foot 113.

Figure 7:
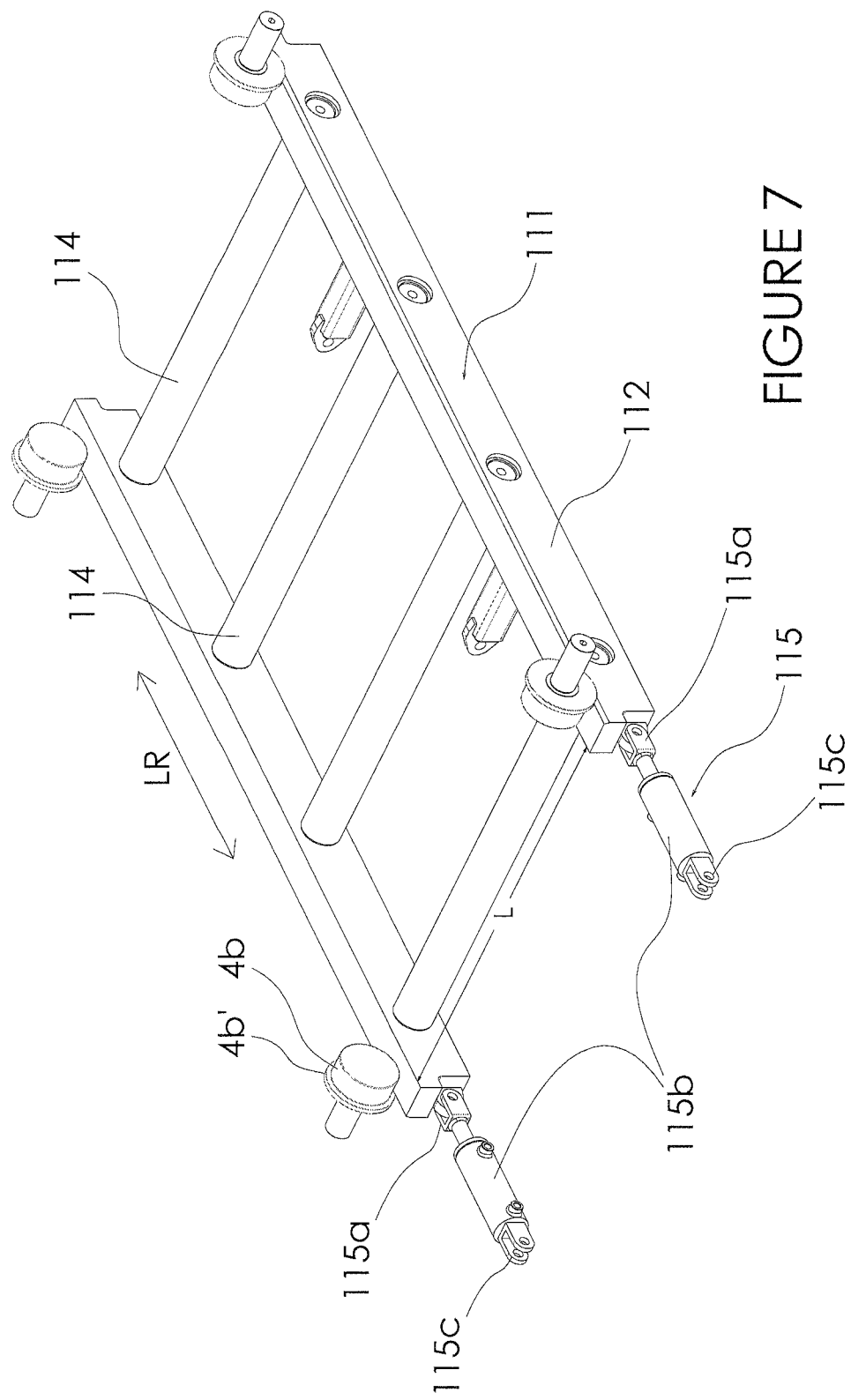
FIG. 7 is an upper perspective view of components of the first driver isolated from FIG. 6.

First driver 115 may be one or more linear actuators, such as for example a screw drive or a telescoping member such as hydraulic cylinder 115b (as shown) connected between main body 5 and frame 111. FIG. 7 shows, in isolation, the first driver and its attachment and mode of operation with frame 111. While rollers 4b are connected to the box frame of main body 5, the rollers are shown in FIG. 7 without also showing the box frame for simplicity of reference. In the illustrated embodiment, driver 115 includes two hydraulic cylinders 115b, but the operation could be achieved by use of only one cylinder. Each hydraulic cylinder 115b is connected by a clevis 115a to one end of one rail 112 of the frame and each cylinder is connected at its other end by another clevis 115c to the box frame. While rail 112 is held stationary with the foot on the ground (not shown in FIG. 7), linear movement, such as extension/retraction of the cylinder rod, moves (i.e. pulls or pushes) main body 5 to ride along the rails 112 of the frame as shown by arrows LR. In particular, rails 112 are locked to move along the long axis of walls 113b with foot 113. Thus, linear movement of driver 115 is parallel to the long axis of rails 112 and moves the bearing 4a and rollers 4b of main body 5 along rails 112. Main body 5 is free to roll left and right, as pulled or pushed, on the top surface of rails 112 due to rollers 4b bearing on the rails.

Again, driver 115 functions to drive left/right and slew movement of the main body. This function allows the whole rig mat to move left and right if the drivers for pads 3a, 3b are operated together. Alternately, by using the driver 115 on one pad without operating the driver of the other pad or while operating the pad of the other foot in the opposite direction, the rig mat can be rotated, also called slewed.

Figure 8:
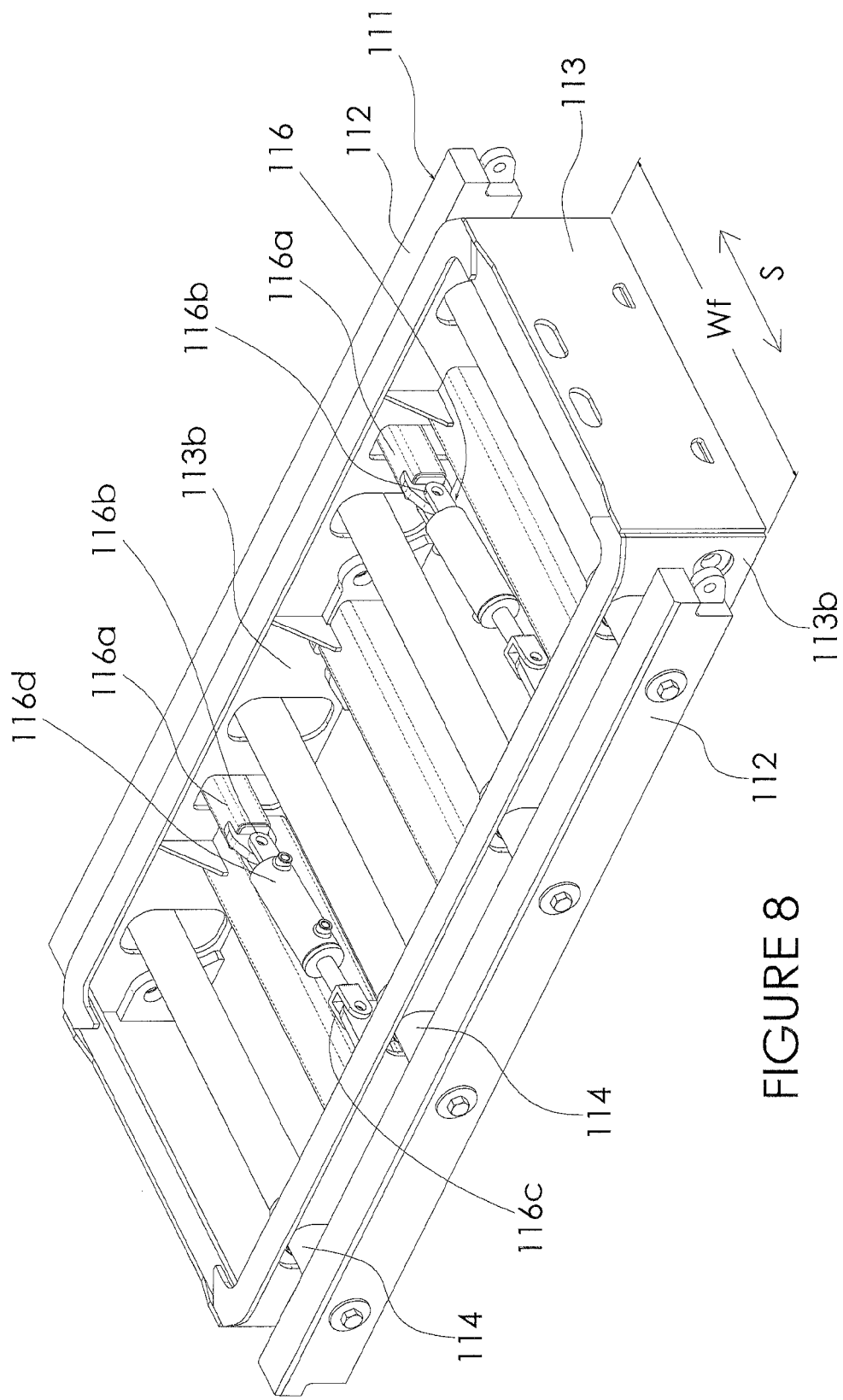
FIG. 8 is an upper perspective view of components of the second driver of the drive assembly isolated from FIG. 6.

Second driver 116 may be one or more linear actuators, such as for example a screw drive or a telescoping member such as hydraulic cylinder 116d (as shown), connected between frame 111 and foot 113. FIG. 8 shows the second driver and pad components in isolation. Second driver 116 is configured to move the frame relative to foot, in particular to move the rungs 114 back and forth through the sides of foot 113, while foot 113 remains stationary on the ground. As rungs 114 are attached to rails 112, movement of rungs 114 also moves rails 112 and thereby rollers 4b and main body 5 (not shown in FIG. 8), which are supported on the rails. As such, second driver 116 moves the whole main body forward and backward, arrow S, relative to the foot.

In this illustrated embodiment, the second driver includes one or more (herein two) cylinders 116d each connected at one end to the ladder frame 111 and at the other end to foot 113. For each cylinder, a driver connector extension 116a extends out inwardly from one of the rails and through an opening in wall 113b of foot. Extension 116a includes a clevis 116b to which cylinder 116d is mounted. The other end of the cylinder is secured, for example via a clevis 116c, to foot 113. The linear movement, arrow S, effected by second driver 116 is along the long axis of rungs 114.

Rig mat 1 is free to slide forward and backward as the rungs 114 slide, as moved by cylinders 116d, back and forth relative to the foot. The range of possible motion is determined by the excess length L of rungs compared to the width Wf of foot 113. Linear bearings (within sleeves 117a in FIG. 9) are provided between rungs 114 and foot 113 to facilitate this movement.

As such, first driver and second driver 115, 116 drive main body 5 of the rig mat horizontally relative to the ground surface, which is a direction parallel to the plane defined by the rig mat upper surface. Of course, first driver 115 could be switched to moving main body 5 front to back and second driver 116 could be switched to moving main body 5 side to side, if desired by turning the pad components and driver assemblies 115, 116 90 degrees within the box frame.

Third driver 117 drives frame 111 substantially orthogonally relative to foot 113, which is substantially vertically, arrow V, in normal use of the rig mat. While the pad, when moving to lift or lower the main body, may be driven to move orthogonal to a plane defined by the upper surface (or lower surface) of the main body, the linear actuator that moves the pad orthogonally operates substantially parallel to the plane of the upper surface of main body and the drive force is translated from a direction substantially parallel to the plane to the orthogonal direction.

Figure 9:
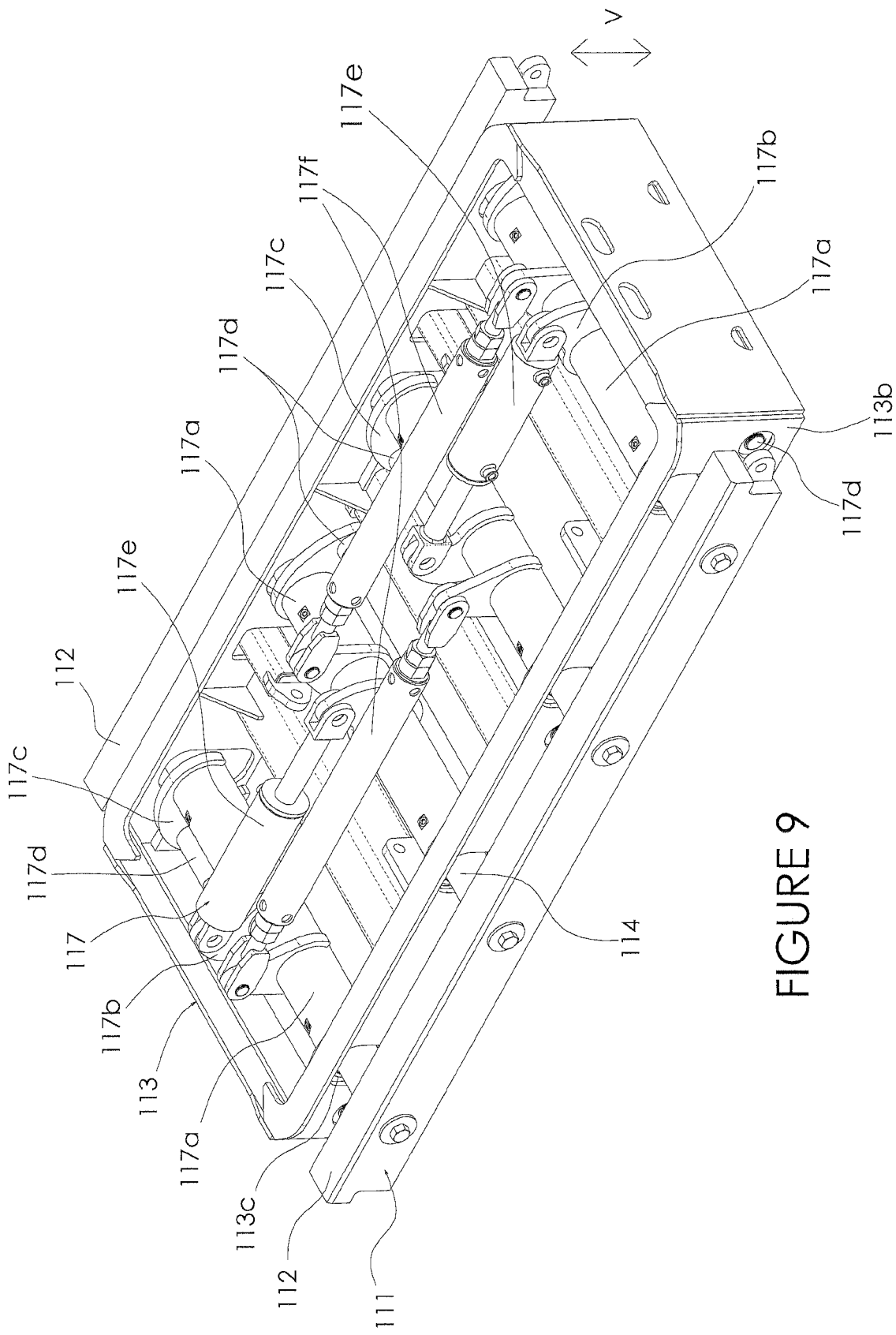
FIG. 9 is an upper perspective view of components of the third driver of the drive assembly isolated from FIG. 6.

FIG. 9 shows the third driver and pad components in isolation. In the illustrated embodiment, driver 117 drives frame 111 such that rungs 114 ride up and down relative to foot 113 (in holes 113c). Third driver 117 in the illustrated embodiment includes an assembly that acts between each rung 114 and the foot. Each assembly includes a bell crank mechanism and a linear actuator, such as a screw drive or, as shown, a cylinder 117e, to drive the bell crank mechanism to rotate around rung and react the rotation into movement of foot. Linear movement of cylinder 117e parallel to the upper surface of the rig mat is converted by the bell crank mechanism to orthogonal motion relative to the upper surface.

Each illustrated bell crank mechanism includes a sleeve 117a journalled on one of the rungs 114, a first bell crank ear 117b pivotally connected to receive drive from the cylinder 117e and a second bell crank ear 117c directly or indirectly connected through a pivotal connection 117d, such as a pivot rod, to the foot 113. There may be two second bell crank ears 117c connecting between ends of sleeve 117a and ends of the pivot rod to distribute forces. Of course being a bell crank mechanism, ears 117b, 117c are each angularly fixed relative to sleeve 117a to redirect incoming drive at ear 117b to substantially orthogonal drive from ear 117c.

As will be described further, if second bell crank ear 117c is not directly connected to connection 117d, a secondary linkage 117g may be provided between ear 117c and connection 117d.

There may be a third driver including bell crank mechanism and linear actuator for each rung. However, it has been found that one linear actuator may act for two assemblies by suitably orienting one bell crank mechanism at a first end of the linear actuator to rotate clockwise and another bell crank mechanism at an opposite end of the linear actuator to rotate counterclockwise. In the illustrated embodiment, one cylinder 117e drives the bell crank mechanism for each of two rungs. The vertical stroke of the foot is, therefore, half the stroke of the cylinder. Phasing links 117f, such as turnbuckles, may act as synchronization bars and may be employed to synchronize movement between the bell cranks where they are powered by different cylinders to, therefore, ensure level movement between the foot and the frame, preventing the ladder frame 111 from tilting relative to the foot.

In the illustrated embodiment, therefore there are four sleeves 117a and attached bell crank mechanisms 117a, 117b, 117c that rotate around the rungs 114. The second bell crank ear 117c connects the sleeve 117a to pivotal connection 117d with the foot 113, either directly (two sleeves) or indirectly (two other sleeves) through secondary linkage 117g, herein including bars. Bell crank ears 117b are pivotally connected to cylinders 117e. One cylinder drives two bell cranks. Movement of the cylinders forces the bell cranks to rotate their sleeves, one clockwise, one counterclockwise, about the rungs on which the sleeves are installed. This rotational movement is directly referred to rotation of second ears and then reacted through second bell crank ears 117c into movement of foot 113. Secondary linkage 117g accommodates a small amount of lateral movement relative to their pivot rods 117d, as the cylinders are extended and retracted. Secondary linkages 117g, therefore, prevent binding. In particular, the secondary linkage bars 117g may be required to facilitate movement since bell crank ears 117c each travel in arcs (see arrow P, FIG. 10) about their rungs, so secondary linkages 117g are needed to prevent binding.

The third driver, as illustrated, converts the linear horizontal input from cylinders 117e to substantially linear movement, arrow V, perpendicular to cylinders 117e, which in use on a rig mat is along a vertical path. The vertical stroke may be less than a foot, for example, 4 to 8 inches.

Movement of the third driver lifts or lowers frame 111 relative to foot 113. Main body 5 is supported on the frame. If foot remains stationary on the ground, the function of third driver allows the rig mat to be picked up off the ground. This permits, (i) all weight to be placed on feet and may assist with engagement of the feet with the ground and/or (ii) the main body to be moved by first and second drivers 115, 116. Alternately, third driver can be operated to retract foot 113 up recessed into the box frame so that the feet are lifted off the ground. This allows the foot to be positionally reset. While recessed and thereby lifted off the ground, the foot can be moved by first and second drivers 115, 116 to a new position within the box frame and then can be set back down on the ground, allowing further movement of the rig mat, where more significant "walking" movement is desired.

It will be appreciated that the pads and the components of the third drivers are responsible for supporting the weight of main body 5 and anything on the main body during movement of the rig mat. As such, these components are selected to withstand significant loads.

In the illustrated embodiment, the drivers 115, 116 and 117 are based on hydraulics. Hydraulic connectors can be provided to connect the drivers to a hydraulic power supply. In one embodiment, the hydraulic power supply is on the rig, which is supported on the rig mat 1.

Figure 10:
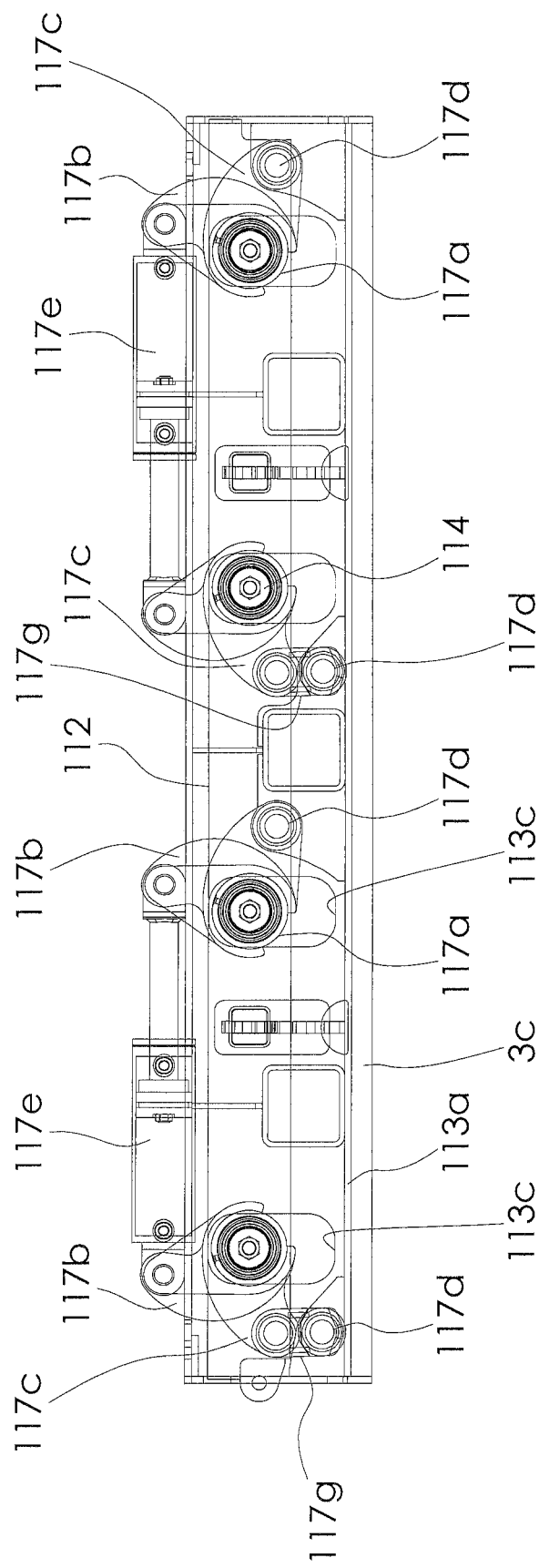
FIG. 10 is a section along line I-I of FIG. 6 with components of the third driver of the drive assembly in a position with maximum extension of the foot from the main body.
Figure 11:
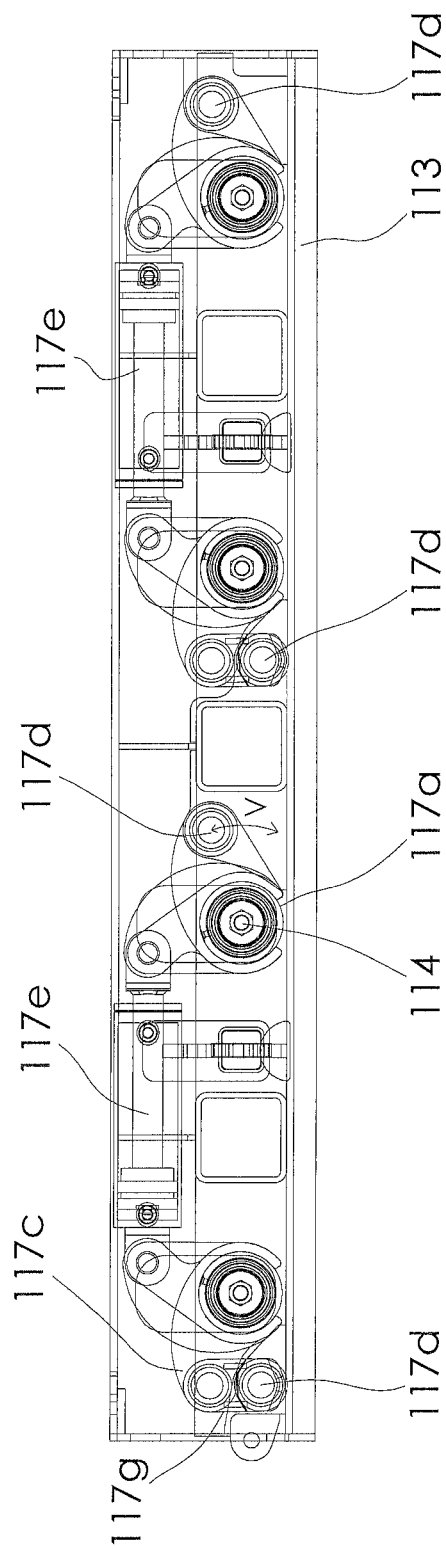
FIG. 11 is a section along line I-I of FIG. 6 with components of the third driver of the drive assembly in a position to retract the foot fully into the main body.

To secure the rig mat in a position on a ground surface, the drive assembly may be employed to support the weight of the rig mat on the feet of its two or more pads such that the feet and possibly cleats 3c are driven into engagement with ground. Specifically with reference to the illustrated embodiment, the rig mat may be set into engagement with the ground to resist shear forces tending to move the rig. For example, in slant rig operations, forces may urge the rig mat to slide over the ground. The rig mat may be set into engagement with the ground by driving cylinders 117e to lift the main body 5 such that its weight, and the weight of anything on the main body such as for example a rig, is borne by feet 113. Driving cylinders 117e to extend drives the bell crank mechanism, which rotates sleeves 117a, which in turn act against pivotal connections 117d to push base 113a of the foot away from rungs 114 (FIG. 10). This lifts main body and drives the feet, and possibly cleats 3c, more into engagement with the ground to resist shear forces. With the main body lifted off the ground, the cylinders 117e can be retracted (FIG. 11) to lower the main body and set it on the ground.

To reduce the extension of the foot relative to the main body, for example, to retract the foot, the cylinders 117e are retracted (FIG. 11), which pulls the base of foot 113 up toward rungs 114.

Figure 12:
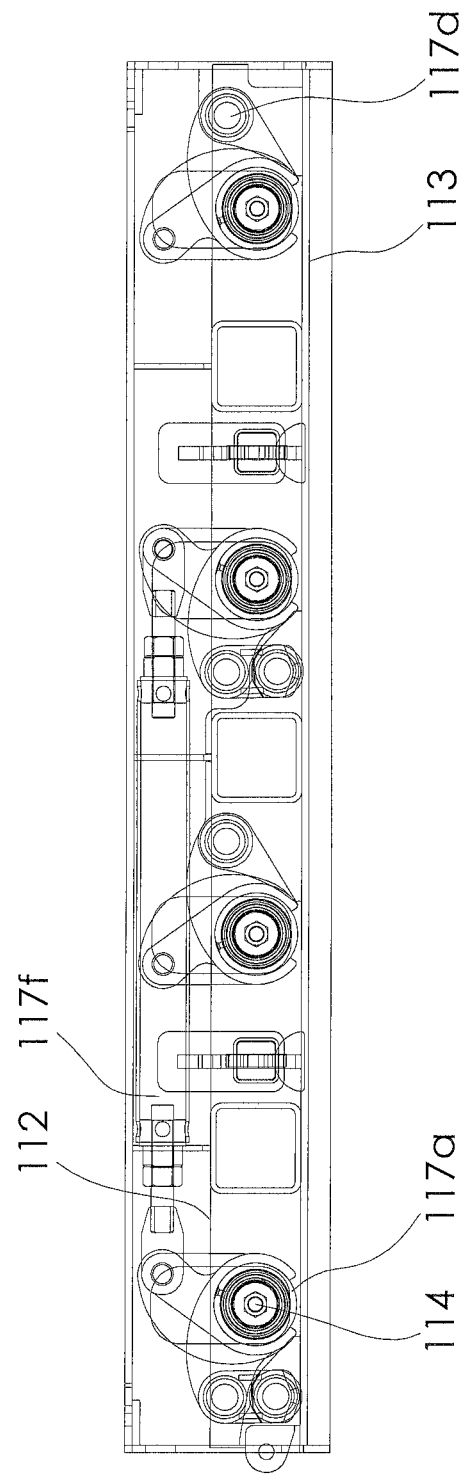
FIG. 12 is a section along line II-II of FIG. 6 with components of the third driver of the drive assembly in a position to retract the foot fully into the main body.

FIG. 12 shows the connection of one synchronization bar 117f between a bell crank mechanism driven by a first cylinder and a bell crank mechanism driven by a second cylinder. The synchronization bars do not change in length.

To move the mat, such as to adjust its position, the drive assembly may be employed to support the weight of the rig mat on its two or more feet and lift main body 5 off the ground. Then the main body 5 can be moved front, back, or laterally, before being set down on the ground. If further movement is required, the feet can be lifted, moved in a particular direction, and then set down into engagement again with the ground surface and the process of lifting and moving main body 5 can be repeated. With the illustrated embodiment, this movement is achieved by driving cylinders 117e to lift the main body 5 on rails 112 such that the main body is out of engagement with the ground. Then first driver 115 and/or second driver 116 are driven to move the main body while feet 113 remain planted on the ground. Then cylinders 117e can be retracted to set the main body on the ground. If further movement is required, cylinders 117e can be further driven to lift the main body out of engagement with the ground and then drivers 115 and/or 116 are driven to reposition the main body relative to the feet so that the process can be repeated. If further, movement that is more significant is required, cylinders 117e can be further driven to lift the pads, while the main body remains supported on the ground. Then drivers 115 and/or 116 can be driven to reposition the pads side to side or front to back within their respective box frames and the feet can be set back down into engagement with the ground, before the main body is lifted by drivers 115 and moved by drivers 115 and/or 116 relative to the feet of pads.

Because the drive system for pad 3a is actuable independently of the drive system for pad 3b, it is possible to move the rig mat non-linearly, such as along a curved path, where the front end of the rig mat is moved in a different direction and/or to a different extent than the rear end. The rig mat can also be moved diagonally by actuating drivers 115 and 116 simultaneously.

These processes can be carried out even with a rig already positioned on the rig mat. Due to this, it is useful that the pads be positioned on the rig mat and the position of the rig on the mat be controlled to provide an acceptable center of gravity. For example, the pads may have a length Lf at least as wide as the axle length of a typical rig to be used with the mat. The tracks 2 are spaced to accommodate the axle length of the rig and pad length is equal to or greater than the space from center track to center track such that regardless of the orientation of the main body relative to the pads, the rigs tires remain supported below by at least a portion of the pads. Guide rails 7, as noted above, are positioned alongside tracks 2 to ensure that the rig may be guided to the correct position with its tires always on tracks. Additionally, the front pad may be spaced from the rear pad a distance at least as long as the wheelbase of a typical rig to be used with the mat. Raised markers 2a, as noted above, can be positioned on tracks 2 to ensure that the rig is guided to the correct position with its tires supported on the rig mat in the space between pads 3a, 3b.

In one embodiment, the rig mat includes a pinning block assembly 118 through which a pipe handler or other devices may be secured to the rig mat. These above-noted rig mat setting and moving processes can be carried out even with a pipe handler or other devices secured to the rig mat, as these other devices are pulled along.

The rig mat offers expanded methods for well site operations. In one embodiment for example, movement of a rig from one wellhead to another may be facilitated. For example, a method may include: placing a first rig mat at a position on a first well site and adjusting the position of the first rig mat such that an axis of the first rig mat is centered on a first well head; placing a second rig mat at a position adjacent a second well head; and conducting well site operations by (i) driving a rig along tracks on the first rig mat, the tracks aligned with the axis, to center the rig on the wellhead and then (ii) moving the rig to the second well head, driving the rig along tire support tracks on the second rig mat, the tire support tracks aligned with the long axis, to center the rig on the second wellhead.

Adjusting the position of the first rig mat may include lifting a main body of the first rig mat to be supported on a front foot and a rear foot of the first rig mat and moving the main body relative to the front and rear foot while the front and rear foot remain planted on a ground surface below the first rig mat. The first rig mat main body may then be set down on the ground surface in its new position.

Positioning may include maintaining the rig on the tracks or tire support tracks by guiding the rig's wheels along raised guide rails that extend along the tracks and tire support tracks parallel to the long axis.

Another method for well site operations may include placing a rig mat 1 at a position on a well site; positioning a rig 10 on the rig mat; and adjusting the position of the rig mat while the rig remains supported on the rig mat such that the rig is centered on a wellhead WC of the well site.

Positioning the rig on the rig mat may include driving the rig along tire support tracks 2 on the rig mat, the tire support tracks aligned with a long axis x of the rig mat. In this embodiment, positioning includes laterally centering the rig on the rig mat. This may include maintaining the rig on the tire support tracks by guiding the rig's wheels along raised guide rails 7 that extend alongside the tire support tracks, parallel to the long axis.

Driving a rig along the tracks may elevate the rig only 10" to two feet off the ground, but may provide a stable base for the rig wherein the rig's weight is distributed across the rig mat underside and this includes mitigating damage to the ground surface on which the rig is positioned. Driving may include driving the truck 11 up a ramp 2d onto the tracks. Driving may also include guiding the rig along the tracks stopping the rig in a position indicated by raised markers.

Adjusting may occur while the mast 14 is lowered or while the mast is erected partially or fully.

Prior to adjusting, the method may include integrating the rig to the rig mat, including for example, tying down the rig to the rig mat for example, through making connects to the eyes 2c. The method may also include placing some of the rig's telescoping support legs on pads 2b.

Operations of the rig mat with respect to adjusting can be driven by connecting to the hydraulic power supply 12 of the rig. Adjusting may include powering the rig mat from the rig hydraulic power supply.

After adjusting, well site operations may proceed on the well site for example with respect to the wellhead. Thereafter, the method may include moving the rig mat while the rig remains supported on the rig mat such that the rig is centered on a second wellhead of the well site.

Adjusting the position of the rig mat may include lifting a main body of the rig mat to be supported on a front foot and a rear foot of the rig mat and moving the main body relative to the front and rear foot while the front and rear foot remain planted on a ground surface below the rig mat. The rig mat main body may then be set down on the ground surface in its new position. Adjusting may include operation of two feet: one at the front of the mat and one at the rear, four or more feet can be used in one rig mat to provide continuous movement for added speed if this is desired.

Adjusting may include driving the bottom of the feet, for example cleats 3c on the bottom of the feet, into engagement with the ground below the rig mat. Driving the bottom of the feet into engagement with the ground may include lifting the weight of the main body while the feet remain on the ground and setting the main body down without moving the feet. Driving the bottom of the feet into engagement with the ground resists sliding movement of the rig mat.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112(f) unless the element is expressly recited using the phrase "means for" or "step for."

The invention claimed is:

1. A vehicle support structure comprising:
a main body including an upper surface, an underside, a front end and a rear end, the main body defining a planar structuring with a thickness;
a front pad coupled to the main body and positioned adjacent the front end;
a rear pad coupled to the main body and positioned adjacent the rear end, the front pad and the rear pad each configured to be moveable between a supporting position protruding from the underside of the main body and a retracted position in plane or retracted from the underside;
a front pad drive mechanism for the front pad, the front pad drive mechanism configured to drive the front pad to move between the supporting position and the retracted position and to move the main body forward and backwards and side to side relative to the front pad; and
a rear pad drive mechanism for the rear pad, the rear pad drive mechanism configured to drive the rear pad to move between the supporting position and the retracted position and to move the main body forward and backwards and side to side relative to the rear pad, the front pad and the rear pad being configured to operate to support the main body in an elevated position relative to a ground surface and configured to move the main body forward and backwards and side to side relative to the front pad and the rear pad and over the ground surface.

2. The vehicle support structure of claim 1 including tire support tracks on the upper surface and extending along a length of the main body from the front end to adjacent the rear end.

3. The vehicle support structure of claim 2 wherein the front end is sloped upwardly.

4. The vehicle support structure of claim 2 further comprising raised tire rails extending alongside the tire support tracks.

5. The vehicle support structure of claim 2 further comprising raised markers on the tracks, the raised markers positioned along the length between the front pad and the rear pad.

6. The vehicle support structure of claim 2 further comprising liquid containment pans positioned between the tire support tracks.

7. The vehicle support structure of claim 1 wherein the front pad drive mechanism includes a hydraulic cylinder that moves along a direction substantially parallel to a plane defined by the upper surface and the hydraulic cylinder drives movement of the pad between the supporting position and the retracted position.

8. The vehicle support structure of claim 1 wherein the main body includes a width from side to side and the front pad and the rear pad each extend substantially the width of the main body.

9. The vehicle support structure of claim 1 wherein a length measured from the front end to the rear end is 15 to 60 times more than the thickness.

10. The vehicle support structure of claim 1 further comprising liquid containment pans positioned between the tracks.

* * * * *